US006922992B1

(12) United States Patent
Morgan

(10) Patent No.: US 6,922,992 B1
(45) Date of Patent: Aug. 2, 2005

(54) HYDRAULIC DRIVE CIRCUIT WITH FLOW DIVIDER AND BYPASS VALVE

(76) Inventor: George H. Morgan, 401 Tyler Ave., Evansville, IN (US) 47715-3243

( * ) Notice: Subject to any disclaimer, the term of this patent is extended or adjusted under 35 U.S.C. 154(b) by 253 days.

(21) Appl. No.: 10/397,398

(22) Filed: Mar. 26, 2003

Related U.S. Application Data

(60) Provisional application No. 60/413,402, filed on Sep. 24, 2002.

(51) Int. Cl.[7] .............................................. F16D 31/02
(52) U.S. Cl. .......................................... 60/484; 91/514
(58) Field of Search ............................ 60/484; 91/514

(56) References Cited

U.S. PATENT DOCUMENTS 4,335,894 A * 6/1982 Swanson ................ 280/43.23
4,496,004 A * 1/1985 Frase et al. ................ 172/311
4,609,019 A * 9/1986 Hutson .................... 144/208.8
5,511,368 A * 4/1996 Kocher ....................... 56/15.2
6,279,317 B1 8/2001 Morgan ....................... 60/413
6,438,951 B2 8/2002 Morgan ....................... 60/419

OTHER PUBLICATIONS

ASAE #911596, 1991 Gerotor Flow Divider by George H. Morgan.
Cross Valve Data Sheet 1980 SD5 Series Selector Valve Data Sheet.

* cited by examiner

*Primary Examiner*—Thomas E. Lazo
(74) *Attorney, Agent, or Firm*—Mark A. Manley, P.E.; Gary K. Price

(57) ABSTRACT

A hydraulic drive with a flow divider and a bypass wherein fluid can either be allowed to flow from a flow divider to hydraulic actuators in parallel or the fluid can be allowed to bypass the flow divider and flow directly to the hydraulic actuators in parallel.

11 Claims, 2 Drawing Sheets

HYDRAULIC DRIVE CIRCUIT WITH FLOW DIVIDER AND BYPASS VALVE

CROSS REFERENCES TO RELATED APPLICATIONS

Provisional Application for Patent No. 60/413,402, filed on Sep. 24, 2002, with the same title, "Hydraulic Drive Circuit With Flow Divider and Bypass valve" which is hereby incorporated by reference. Applicant claims priority pursuant to 35 U.S.C. Par. 119(e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to a hydraulic circuit using a flow divider as a means of dividing flow in conjunction with a valve means that permits bypassing the flow divider as desired.

2. Background Information

Hydraulic systems are popular in applications involving hazardous, dirty, and nasty environments, such as coal mines, quarries, food processing plants, and construction sites. Much effort has been expended in trying to increase the efficiency and performance ranges of hydraulic drives.

Open loop hydraulic circuits are very common in industrial applications as they are often less expensive than circuits known, in the trade, as closed loop systems which comprise a fixed or variable displacement pump supplied with fluid by means of a charge pump.

Flow dividers are popular for splitting hydraulic fluid flows to actuators such as, but not restricted to, motors and cylinders. Valve type flow dividers are very popular because of low cost. Rotary flow dividers are less common, but often used because of some of their performance advantages.

Any component in a hydraulic system uses some power to operate. It is inherent in the Second Law of Thermodynamics, which can be phrased as: "The house always takes its cut".

In hydraulic vehicle drives, the desirability of using a flow divider, especially a rotary flow divider, is offset by the pressure drop of fluid flowing through the flow divider as well as friction inherent in a rotary flow divider. Consequently, applicant is unaware of any successful use of a rotary flow divider in conjunction with vehicles with hydraulic drive wheels.

For purposes of definition, the term hydraulic as used in hydraulic drives encompases both closed loop hydrostatic drives as well as open loop hydraulic drives.

As will be seen from the subsequent description, the preferred embodiments of the present invention overcomes these and other shortcomings of existing hydraulic flow dividing technologies.

SUMMARY OF THE INVENTION

The present invention in the preferred embodiment is a flow divider used in conjuntion with a bypass valve so that a hydraulic drive may be operated either with or without the flow divider. This permits the use of the flow divider as needed, and the bypassing of the flow divider to save energy when the flow divider is not required.

DESCRIPTION OF THE PREFERRED EMBODIMENTS

Figure 1:
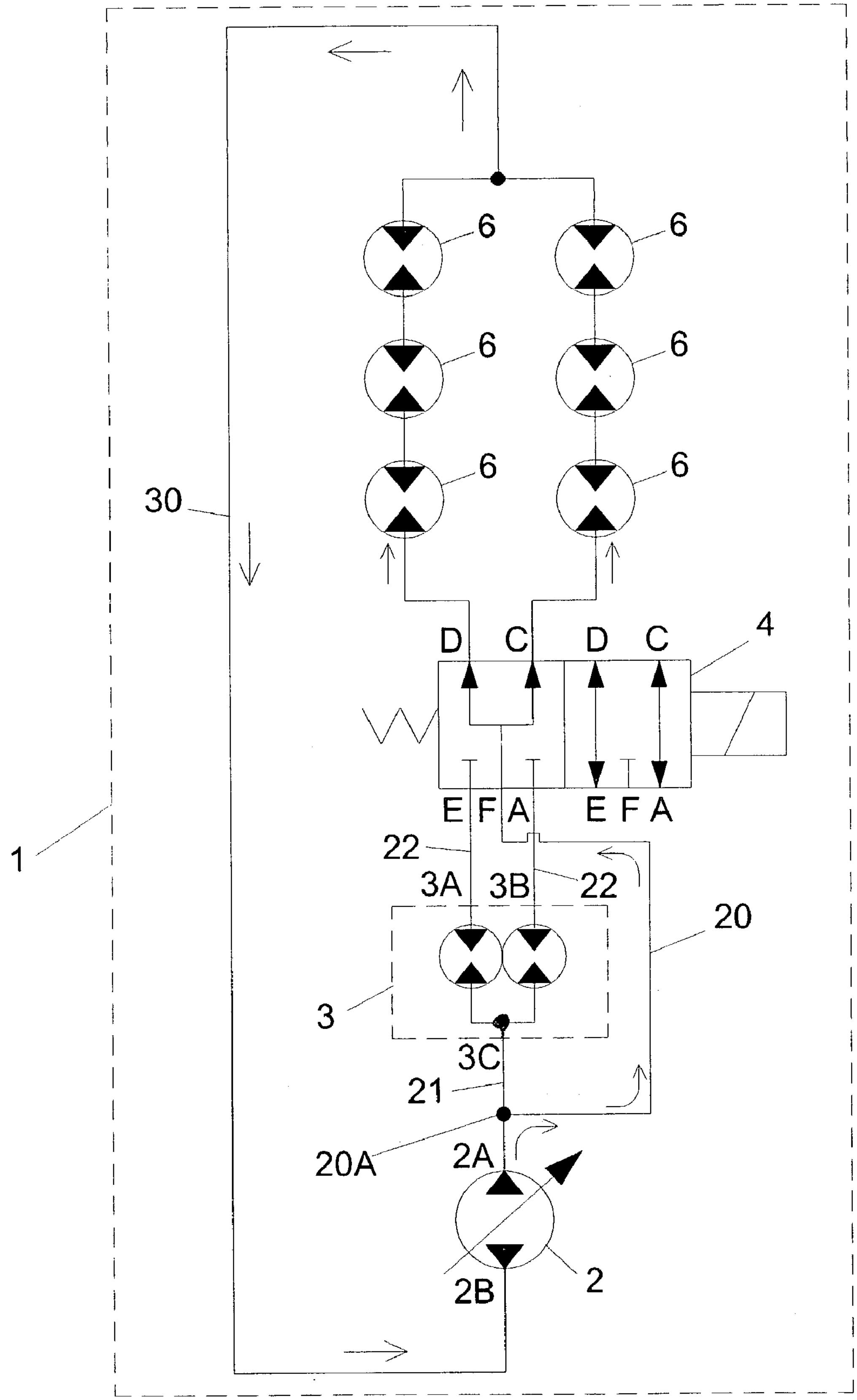
FIG. 1 illustrates the preferred embodiment of the present invention, a hydraulic drive with a flow divider operating in conjunction with a bypass valve wherein the bypass valve is in a normal, at rest, unactuated position.
Figure 2:
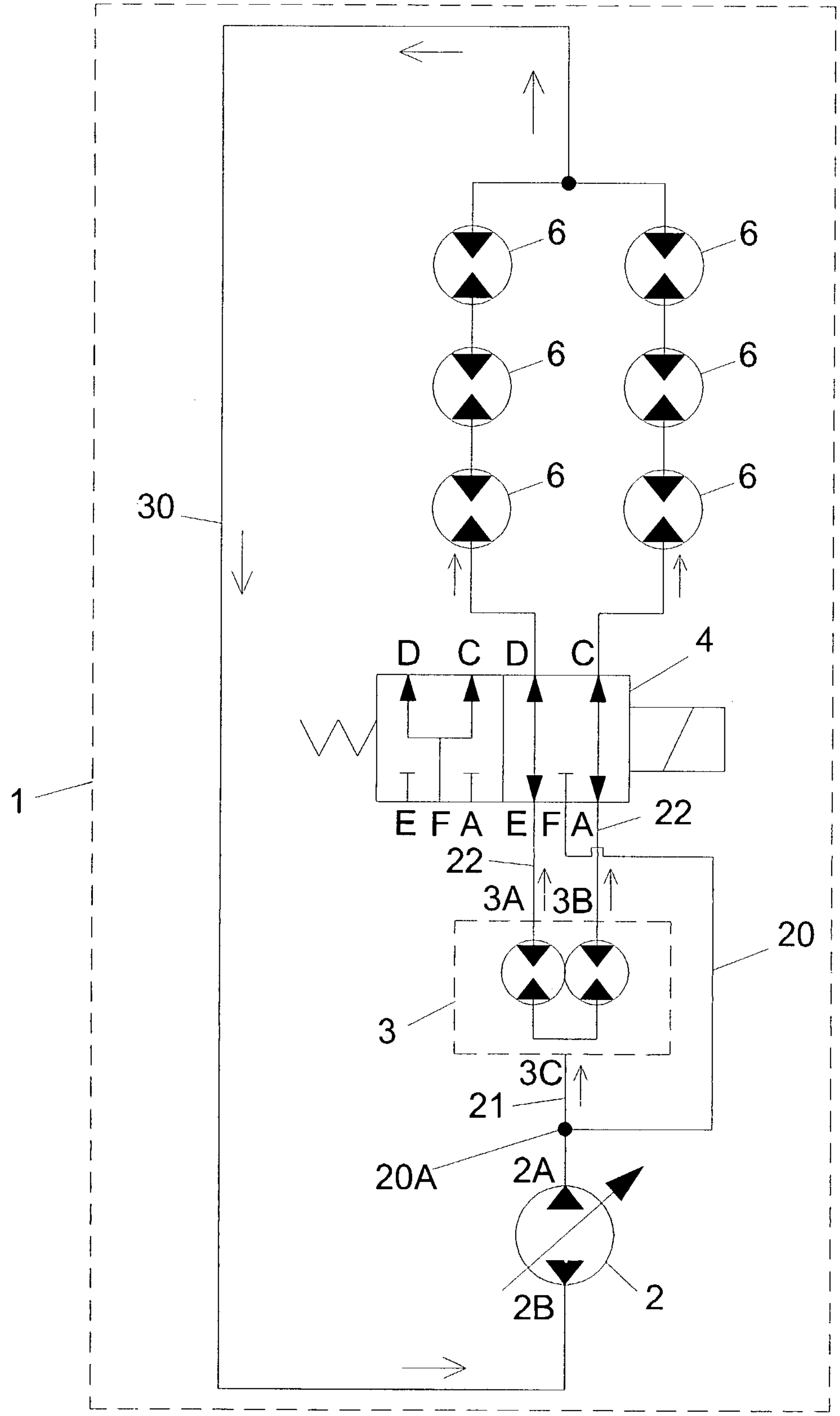
FIG. 2 illustrates the operation of the preferred embodiment of the present invention when said valve means is actuated which permits flow of fluid from a pump through the flow divider through the hydraulic drive.

FIGS. 1 and 2 illustrate the preferred embodiment of the present invention, a hydraulic drive circuit 1 comprising a flow divider 3 and a bypass means 4.

The circuit 1 further comprises a pump 2, actuators 6, a junction 2A, pressure lines 20, 21, and 22, and return lines 30.

The pump 2 comprises ports 2A and 2B.

In the preferred embodiment, the flow divider 3 is a gerotor flow divider, such as is available from White Hydraulics, a manufacturer, located in Hopkinsville, Ky. For enablement purposes, for a 40 gallon per minute pump, the White model FD00181800F is an appropriate model.

The flow divider 3 comprises output ports 3A and 3B and an inlet port 3C.

The bypass means 4, in the preferred embodiment, as an enablement disclosure, is a two position, two section, five port valve, with a spring return, known as an SDS selector valve, available from Cross Manufacturing Company, 100 Factory Street, Lewis, Kans. 67552, according to their literature, VSD1 8/87.

Available bypass means 4 operators comprise knob, plain, clevis, handle, hydraulic pilot, and DC electric solenoid.

The bypass means 4, in the preferred embodiment comprises ports A, C, D, E, and F.

The hydraulic circuit 1 is shown as a closed loop hydrostatic drive circuit with actuators 6 shown in a series parallel arrangement, i.e. two parallel sets, or rows of three actuators 6 in series.

Flow from the pump outlet 2A splits at the junction 20A into pressure lines 20 and 21. The pressure line 20 is connected to port F of the bypass means 4. The pressure line 21 connects to the flow divider inlet 3C of the flow divider 3.

Port 3A of the flow divider 3 is connected to port E of the bypass means 4. Port 3B of the flow divider 3 is connected to port B of the bypass means 4.

FIG. 1 shows the bypass means 4 in the unactivated, normal, at rest mode, wherein the ports A and E of the bypass means 4 are blocked, meaning no flow is possible from the flow divider 3 through the pressure lines 22 through said ports A and E of the bypass means 4.

However, fluid does flow through the pressure line 20 that connects to port F of the bypass means 4. As port F is open and connected to ports D and C, fluid passes to the rotary actuators 6. When the rotary actuators 6 power wheels of a vehicle, normally ground contact results in equal flow to each row of rotary actuators 6.

The bypass means 4 can be selected with sufficient flow capacity so as to minimize pressure drops through the bypass means 4 as compared to flowing through the flow divider 3, for normal operation.

However, when there is a problem, such as can be encountered when a vehicle with hydraulic actuators 6 in a series parallel circuit is climbing a hill at an angle, where flow to each row of actuators 6 can become unbalanced, the bypass means 4 can be actuated, (ref. FIG. 2) so that the flow from the ports 3A and 3B of the flow divider 3 now flows through the ports E and A, respectively, of the bypass means 4, maintaining equal flow to each row of actuators 6. The fluid flow from the pressure line 20 to the port F of the bypass means 4 is now blocked.

Although the description above contains many specificities, these should not be construed as limiting the scope of the invention but as merely providing illustrations of some of the presently preferred embodiments of this invention.

While gear type rotary flow dividers of high capacity with low pressure drop exist, they tend to be considerably more expensive and less efficient across the lower speed ranges than gerotor flow dividers such as are manufactured by White Hydraulics.

Also, the term fluid is intended to cover any fluid suitable for serving its intended purpose in the preferred embodiment of the invention described. There are many different types of fluids currently used or being developed for hydraulic drives, such as, but not restricted to, hydraulic oils, engine oils, synthetic oils, vegetable base oils, even water with and without additives.

It will be obvious to those skilled in the art that modifications may be made to the embodiments described above without departing from the scope of the present invention. Thus the scope of the invention should be determined by the appended claims in the formal application and their legal equivalents, rather than by the examples given.

I claim:

1. A hydraulic drive circuit comprising:

a) a flow divider;

b) hydraulic actuators in parallel; and c) a bypass means;

wherein the flow divider splits fluid flow between said hydraulic actuators in parallel; and wherein said bypass means permits fluid to flow directly to said hydraulic actuators in parallel, bypassing and blocking said flow divider.

2. The hydraulic drive circuit of claim 1 wherein said bypass means includes a valve located in the circuit between said flow divider and said actuators in parallel.

3. A hydraulic drive circuit comprising;

a) a pump having an outlet;

b) a fluid flow divider, c) hydraulic actuators in parallel and d) a bypass means, wherein the flow divider splits fluid flow from said pump between said hydraulic actuators in parallel and wherein said bypass means permits fluid to flow from said pump outlet directly to said hydraulic actuators in parallel bypassing and blocking flow from said flow dividers.

4. The hydraulic drive circuit of claim 3 wherein said bypass means includes a valve located in said circuit upstream from said actuators and downstream from said flow divider.

5. The hydraulic drive circuit of claim 4 wherein said valve is a two position solenoid valve.

6. The hydraulic drive circuit of claim 4 wherein said bypass means includes a bypass line and a valve and wherein said valve has a first position wherein fluid flow through said flow divider is blocked and said valve has a second position wherein flow through the bypass line is blocked.

7. The hydraulic drive circuit of claim 3 wherein the fluid flow divider comprises a gerotor flow divider having an inlet and first and second outlet, said first and second outlets connected to one of parallel ports of a two position solenoid valve.

8. A hydraulic drive circuit comprising;

a) a flow divider, and b) a first set of hydraulic actuators and a second set of hydraulic actuators in parallel to said first set of hydraulic actuators and bypass means, wherein the flow divider splits fluid flow between said first and second sets of hydraulic actuators in response to an uneven loading applied to said first and second sets of actuators and wherein bypass means bypasses said flow divider in response to an even loading on said first and said second sets of hydraulic actuators.

9. The hydraulic drive circuit of claim 8 wherein the flow divider is a gerotor flow divider.

10. The hydraulic drive of circuit of claim 9 wherein said bypass means includes a two position solenoid valve.

11. The hydraulic drive circuit of claim 10 wherein the gerotor flow divider has an inlet connected to a pump and first and second outlets connected to parallel ports of said two position solenoid valve.

* * * * *